United States Patent [19]

Ball

[11] Patent Number: 5,764,827
[45] Date of Patent: Jun. 9, 1998

[54] LIMITED ROTATION CONNECTION DEVICE

[75] Inventor: Randall W. Ball, Panama City Beach, Fla.

[73] Assignee: The United States of America as represented by the Secretary of the Navy, Washington, D.C.

[21] Appl. No.: 804,857

[22] Filed: Feb. 24, 1997

[51] Int. Cl.[6] ..................................................... G02B 6/26
[52] U.S. Cl. ................................. 385/26; 385/25; 385/16; 385/20; 385/15
[58] Field of Search ................................ 385/15, 16, 20, 385/21, 22, 25, 26

[56] References Cited

U.S. PATENT DOCUMENTS

| | | | |
|---|---|---|---|
| 4,753,501 | 6/1988 | Battle | 385/25 |
| 4,875,756 | 10/1989 | Estes et al. | 385/25 |
| 5,031,994 | 7/1991 | Emmons | 385/25 |
| 5,649,036 | 7/1997 | Anderson et al. | 385/16 |
| 5,664,034 | 9/1997 | Mock | 385/16 |

*Primary Examiner*—John Ngo
*Attorney, Agent, or Firm*—Harvey A. Gilbert

[57] ABSTRACT

A limited rotation connection device includes a housing defining a central hole extending therethrough and a central shaft extending through the central hole of the housing and being rotatably mounted to the housing, the housing also defining an annular slot surrounding and extending in substantially perpendicular relation to the central shaft. The device also includes an elongated flexible communication element disposed in the annular slot of the housing and having a first opposite end portion mounted to the central shaft and a second opposite end portion mounted to the housing. The communication element is collapsible and expandable upon rotation of the central shaft relative to the housing so as to allow limited rotations of the opposite end portions of the communication element relative to one another before reversing rotation direction becomes necessary. The first opposite end portion of the communication element is connectable to a first external communication device. The second opposite end portion of the communication element is held stationary and is connectable to a second external communication device.

20 Claims, 2 Drawing Sheets

LIMITED ROTATION CONNECTION DEVICE

BACKGROUND OF THE INVENTION

1. Field of the Invention

The present invention generally relates to rotational connections for accommodating flexible communication elements and, more particularly, is concerned with a limited rotation connection device that allows limited rotations of one end of a flexible communication element relative to an opposite end thereof before reversing rotation direction becomes necessary.

2. Description of the Prior Art

Rotational connections of various configurations for accommodating flexible communication elements, such as fiber optics, electrical cable, gas or fluid tubing and the like, are well-known in the prior art. As an example, rotational connections for many electrical applications employ slip rings. Furthermore, fiber optic rotational connections are known which use rotary optical devices. Drawbacks exist, however, in rotational connections for many types of flexible communication elements. Many of the conventional multiple channel optical rotational connections are too large, complex and/or expensive.

With many advances in modern technology, such as in high data rate communications, there is an accompanying need for advances in design of rotational connections to accommodate that technology. These advancements, however, must overcome or avoid drawbacks of the prior art without introducing any new problems in their place.

SUMMARY OF THE INVENTION

The present invention provides a limited rotation connection device designed to satisfy the aforementioned need. The concept underlying the limited rotation connection device of the present invention is to provide a device allowing limited rotations of one end of a flexible communication element relative to an opposite end thereof before reversal of rotation direction becomes necessary. The limited rotation connection device will reduce the size, complexity and high cost of present rotational connections, especially with regard to fiber optics applications.

Accordingly, the present invention is directed to a limited rotation connection device which comprises: (a) a housing defining a central hole extending therethrough; (b) a central shaft extending through the central hole of the housing and being rotatably mounted to the housing, the housing also defining an annular slot extending in substantially transverse relation to the central shaft; and (c) an elongated flexible communication element disposed in the annular slot of the housing and having a first opposite end portion mounted to the central shaft and a second opposite end portion mounted to the housing. The communication element is collapsible and expandable upon rotation of the central shaft relative to the housing so as to allow limited rotations of the opposite end portions of the communication element relative to one another before reversing rotation direction becomes necessary. When the central shaft and first opposite end portion of the communication element rotate in one direction, such as clockwise, the communication element winds up around the central shaft. When the central shaft and first opposite end portion of the communication element rotate in an opposite direction, such as counterclockwise, the communication element unwinds from around the central shaft.

More particularly, the housing has a pair of opposite end walls and a continuous sidewall extending between the opposite end walls. The continuous sidewall and opposite end walls define the annular slot. Each of the opposite end walls has the central hole defined therethrough. The central shaft has a pair of opposite ends and extends through each of the central holes of the opposite end walls of the housing and is rotatably mounted to the housing. The central shaft defines an elongated passageway therethrough.

The communication element is disposed in the annular slot of the housing and is wound upon itself around the central shaft. The communication element has the pair of opposite end portions and a main portion extending between and interconnecting the opposite end portions. The first opposite end portion is attached to and extends through the central shaft into the passageway thereof for connecting to a first external communication means. The second opposite end portion is attached to and extends through the continuous sidewall of the housing for connecting to a second external communication means. The main portion of the communication element is capable of winding and unwinding between collapsed and expanded conditions upon rotation of the central shaft relative to the housing so as to allow limited rotations of the opposite end portions of the communication element relative to one another before reversing rotation direction becomes necessary.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
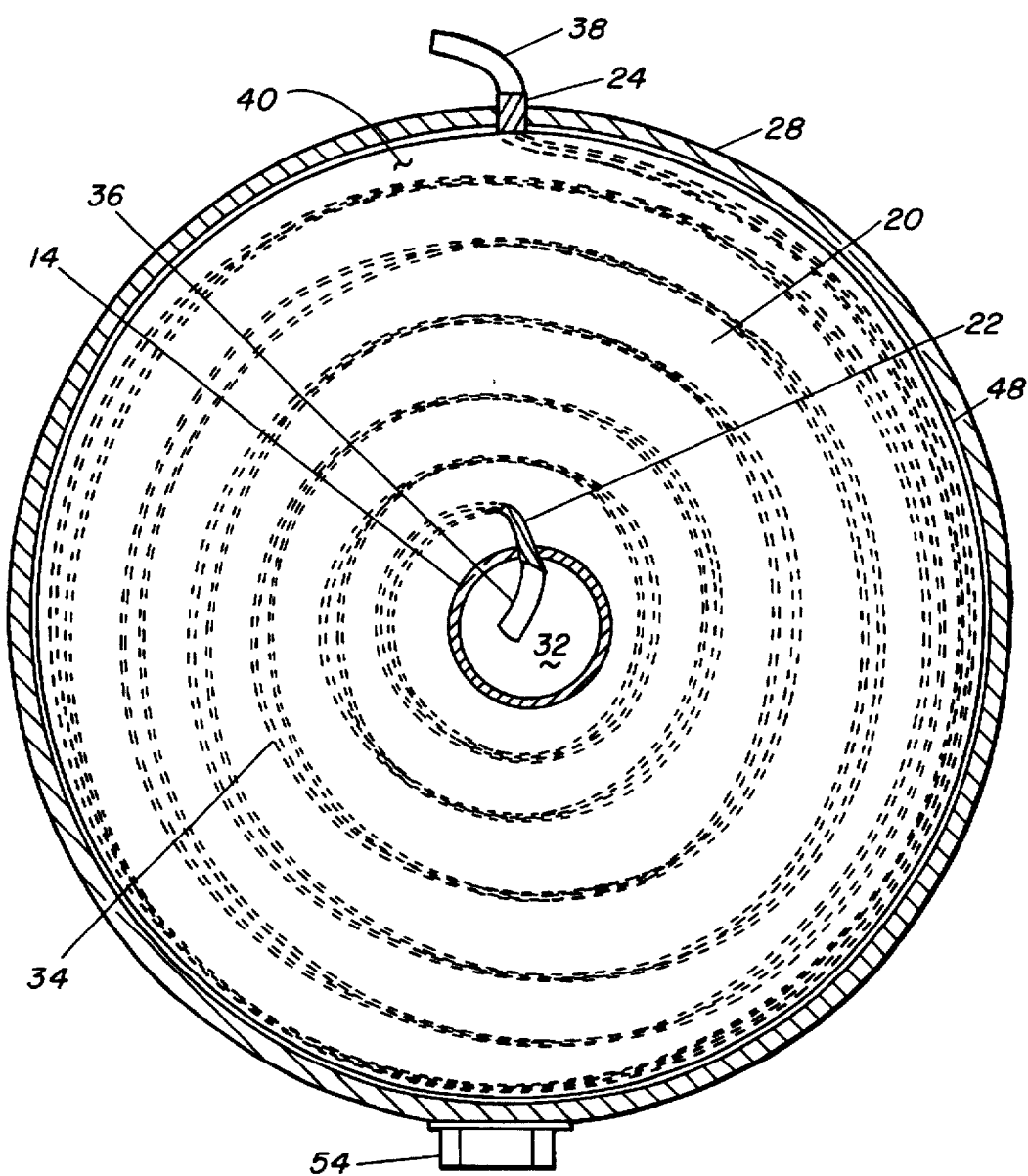
FIG. 1 is a circumferential sectional view of a limited rotation connection device of the present invention taken perpendicular to a central axis of the device.
Figure 2:
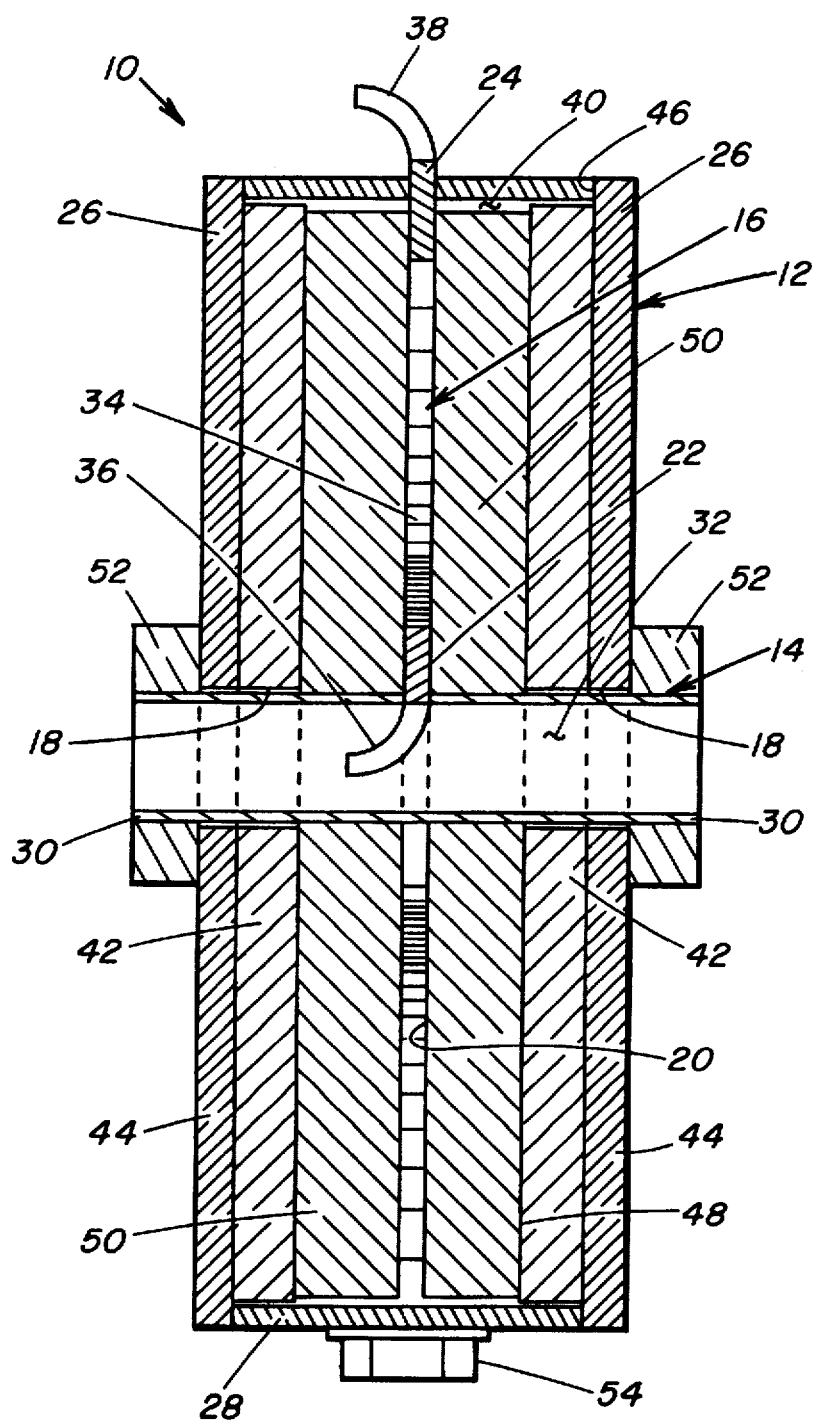
FIG. 2 is a diametrical sectional view of the limited rotation connection device taken along the central axis of the device.

Referring to the drawings and particularly to FIGS. 1 and 2, there is illustrated a limited rotation connection device, generally designated 10, of the present invention. Basically, the limited rotation connection device 10 includes a housing 12, a central shaft 14 and an elongated flexible communication element 16. The housing 12 defines a central hole 18 extending therethrough and an annular slot 20 in substantially transverse, and preferably perpendicular, relation to the central shaft 14. The central shaft 14 extends through the central hole 18 of the housing 12 and is rotatably mounted to the housing 12. The communication element 16 has a first opposite end portion 22 attachably mounted to the central shaft 14 and a second opposite end portion 24 attachably mounted to the housing 12. The communication element 16 is collapsible and expandable upon rotation of the central shaft 14 relative to the housing 12 so as to allow limited rotations of the opposite end portions 22, 24 of the communication element 16 relative to one another before reversing rotation direction becomes necessary. When the central shaft 14, and first opposite end portion 22 of the communication element 16 connected therewith, are rotated in one direction, such as clockwise, the communication element 16 winds up around the central shaft 14. When the central shaft 14, and first opposite end portion 22 of the communication element 16 connected therewith, are rotated in the opposite direction, such as counterclockwise, the communication element 16 unwinds from around the central shaft 14.

The housing 12 has a pair of opposite end walls 26 and a continuous sidewall 28 extending between the opposite end walls 26. The continuous sidewall 28 and the opposite end walls 26 together define the annular slot 20. The opposite end walls 26 together defining the central hole 18 of the housing 12. The central shaft 14 has a pair of opposite ends 30 extending through and beyond the central hole 18 of the opposite end walls 26 of the housing 12 and is rotatably mounted to the housing 12. The central shaft 14 also forms an elongated passageway 32 therethrough.

The communication element 16 is disposed in the annular slot 20 of the housing 12 and is wound upon itself around the central shaft 14. The communication element 16 has the pair of opposite end portions 22, 24 and a main portion 34 which extends between and interconnects the opposite end portions 22, 24. The first opposite end portion 22 is attached to and extends through the central shaft 14 into the passageway 32 thereof for connecting to an end 36 of first external communication means, such as a coaxial cable. The second opposite end portion 24 is attached to and extends through the continuous sidewall 28 of the housing 12 for connecting to an end 38 of second external communication means, such as another coaxial cable. The main portion 34 of the communication element 16 is flexible and thus capable of winding and unwinding between collapsed and expanded conditions upon rotation of the central shaft 14 relative to the housing 12 so as to allow limited rotations of the opposite end portions 22, 24 of the communication element 16 relative to one another before reversing rotation direction becomes necessary. As seen in FIG. 1, the main portion 34 of the element 16 is shown in a partially collapsed and partially expanded condition about midway between fully collapsed and fully expanded conditions.

Each of the opposite end walls 26 of the housing 12 are substantially flat and circular in shape but can have any other suitable configuration. Preferably, the opposite end walls 26 are substantially transparent such that the condition of the communication element 16 can be assessed by sight from a point outside of the housing 12. The continuous sidewall 28 of the housing 12 is substantially cylindrical in shape but can have any other suitable configuration. The opposite end walls 26 and the continuous sidewall 28 define an interior cavity 40 in the housing 12. Each of the opposite end walls 26 has inner and outer portions 42, 44 defining an annular recess 46. The continuous sidewall 28 extends between the inner and outer portions 42, 44 of the opposite end walls 26. The continuous sidewall 28 is confined within the annular recess 46. The inner and outer portions 42, 44 of the opposite end walls 26 have the central hole 18 defined therethrough which receives the opposite ends 30 of the central shaft 14. The inner and outer portions 42, 44 of the opposite end walls 26 are substantially flat and circular in shape but can have any other suitable configuration and are also substantially transparent.

The communication element 16 may be a fiber optic cable or the like of constant length wherein one end 22 of the constant length communication element 16 rotates with the central shaft 14 while the other end 24 does not rotate but remains stationary with the housing 12. In a winch application or the like, as tow cable pays out, the communication element 16 running along the tow cable provides a continuous optical link between a fixed non-rotational connection point, at the second opposite end portion 24, and the rotating winch axle connection point beyond first opposite end portion 22.

The device 10 may further include a body 48 in the interior cavity 40 having a pair of opposite side portions 50 which are mounted about the central shaft 14 and define the annular slot 20 which surrounds the central shaft 14 and extends in the substantially transverse relation thereto between the central shaft 14 and the continuous sidewall 28 of the housing 12. Each of the opposite side portions 50 are substantially flat and circular in shape but can have any other suitable configuration. Preferably, the opposite side portions 50 are substantially transparent such that the condition of the communication element 16 can be assessed by sight through the also substantially transparent opposite end walls 26 of the housing 12 from a point outside of the housing 12. The communication element 16 is disposed in the annular slot 20 between the opposite side portions 50 of the body 48. The body 48 preferably is mounted on the central shaft 14 so as to rotate therewith. As an alternative, the body 48 could be fixed to the end walls 26 of the housing 12.

The device 10 further comprises a pair of opposite shaft collars 52 mounted to the opposite ends 30 of the central shaft 14 extending beyond the end walls 26 of the housing 12. The shaft collars 52 are for rotatably retaining the central shaft 14 through the central holes 18 of the opposite end walls 26 of the housing 12. The shaft collars 52 are substantially annular in shape but can have any other suitable configuration. The shaft collars 52 preferably rotate with the central shaft 14. The device 10 also comprises a fastener 54 for attaching to a support structure for retaining the housing 12, and the second opposite end portion 24 of the communication element 16 therewith, in a stationary position.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A limited rotation connection device, comprising:
   (a) a housing defining a central hole extending therethrough;
   (b) a central shaft extending through said central hole of said housing and being rotatably mounted to said housing, said housing also defining an annular slot surrounding and extending in substantially transverse relation to said central shaft; and
   (c) an elongated flexible communication element disposed in said annular slot of said housing and having first and second opposite end portions, said first opposite end portion being mounted to said central shaft and said second opposite end portion being mounted to said housing, said communication element being collapsible and expandable upon rotation of said central shaft relative to said housing so as to allow limited rotations of said opposite end portions thereof relative to one another before reversing rotation direction becomes necessary.

2. The device of claim 1 wherein said first opposite end portion of said communication element is connectable to a first external communication means and said second opposite end portion of said communication element is connectable to a second external communication means.

3. The device of claim 1 wherein:

said central shaft has a pair of opposite ends; and said device further comprises a pair of opposite shaft collars mounted to said opposite ends of said central shaft adjacent to opposite ends of said housing for rotatably retaining said central shaft through said central hole of said housing.

4. The device of claim 1 further comprising:

a fastener for retaining said housing and said second opposite end portion of said communication element in a stationary position.

5. A limited rotation connection device, comprising:

(a) a housing having a pair of opposite end walls and a continuous sidewall extending between said opposite end walls, said continuous sidewall and said opposite end walls together defining an annular slot, each of said opposite end walls having a central hole defined therethrough;

(b) a central shaft having a pair of opposite ends and extending through each of said central holes of said opposite end walls of said housing and being rotatably mounted to said housing, said central shaft defining an elongated passageway therethrough, said shaft being surrounded by said annular slot which extends substantially perpendicular to said shaft; and (c) an elongated flexible communication element disposed in said annular slot of said housing and wound upon itself around said central shaft, said communication element having a pair of opposite end portions and a main portion extending between and interconnecting said opposite end portions, a first of said opposite end portions being attached to and extending through said central shaft into said passageway thereof for connecting to a first external communication means, a second of said opposite end portions being attached to and extending through said continuous sidewall of said housing for connecting to a second external communication means, said main portion of said communication element being capable of winding and unwinding between collapsed and expanded conditions upon rotation of said central shaft relative to said housing so as to allow limited rotations of said opposite end portions of said communication element relative to one another before reversing rotation direction becomes necessary.

6. The device of claim 5 wherein said opposite end walls of said housing are substantially flat and circular in shape.

7. The device of claim 5 wherein said opposite end walls of said housing are substantially transparent.

8. The device of claim 5 wherein said continuous sidewall of said housing is substantially cylindrical in shape.

9. The device of claim 5 further comprising:

a pair of opposite shaft collars mounted to said opposite ends of said central shaft adjacent to and outwardly of said opposite end walls of said housing, said opposite shaft collars for rotatably retaining said central shaft through said central holes of said opposite end walls of said housing.

10. The device of claim 5 further comprising:

a fastener for retaining said housing and said second opposite end portion of said communication element in a stationary position.

11. A limited rotation connection device, comprising:

(a) a housing having a pair of opposite end walls and a continuous sidewall extending between said opposite end walls and defining an interior cavity in said housing, each of said opposite end walls having a central hole defined therethrough;

(b) a central shaft having a pair of opposite ends and extending through each of said central holes of said opposite end walls of said housing and being rotatably mounted to said housing, said central shaft defining an elongated passageway therethrough;

(c) a body having a pair of opposite side portions mounted about said central shaft and defining an annular slot surrounding said central shaft and extending in substantially transverse relation to said central shaft and between said central shaft and said continuous sidewall of said housing; and (d) an elongated flexible communication element disposed in said annular slot between said opposite side portions of said body and wound upon itself around said central shaft, said communication element having a pair of opposite end portions and a main portion extending between and interconnecting said opposite end portions, a first of said opposite end portions being attached to and extending through said central shaft into said passageway thereof for connecting to a first external communication means, a second of said opposite end portions being attached to and extending through said continuous sidewall of said housing for connecting to a second external communication means, said main portion of said communication element being capable of winding and unwinding between collapsed and expanded conditions upon rotation of said central shaft and said opposite side portions of said body relative to said housing so as to allow limited rotations of said opposite end portions of said communication element relative to one another before reversing rotation direction becomes necessary.

12. The device of claim 11 wherein said opposite end walls of said housing are substantially flat and circular in shape.

13. The device of claim 11 wherein said opposite end walls of said housing are substantially transparent.

14. The device of claim 11 wherein said continuous sidewall of said housing is substantially cylindrical in shape.

15. The device of claim 11 wherein said opposite side portions of said body are substantially transparent.

16. The device of claim 11 further comprising:

a pair of opposite shaft collars mounted to said opposite ends of said central shaft adjacent to and outwardly of said opposite end walls of said housing, said opposite shaft collars for rotatably retaining said central shaft through said central holes of said opposite end walls of said housing.

17. The device of claim 11 further comprising:

a fastener for retaining said housing and said second opposite end portion of said communication element in a stationary position.

18. A limited rotation connection device, comprising:

(a) a housing including
(i) a pair of opposite end walls having inner and outer portions defining an annular recess, and
(ii) a continuous sidewall extending between said outer portions of said opposite end walls and being confined within said annular recess, said inner portions of said opposite end walls and said continuous sidewall defining an interior cavity in said housing, each of said inner and outer portions of said opposite end walls having a central hole defined therethrough;

(b) a central shaft having a pair of opposite ends and extending through each of said central holes of said inner and outer portions of said opposite end walls of said housing and being rotatably mounted to said housing, said central shaft defining an elongated passageway therethrough;

(c) a body having a pair of opposite side portions mounted about said central shaft and defining an annular slot surrounding said central shaft and extending substantially perpendicular to said central shaft between said central shaft and said continuous sidewall of said housing; and (d) an elongated flexible communication element disposed in said annular slot between said opposite side portions of said body and wound upon itself around said central shaft, said communication element having a pair of opposite end portions and a main portion extending between and interconnecting said opposite end portions, a first of said opposite end portions being attached to and extending through said central shaft into said passageway thereof for connecting to a first external communication means, a second of said opposite end portions being attached to and extending through said continuous sidewall of said housing for connecting to a second external communication means, said main portion of said communication element being capable of winding and unwinding between collapsed and expanded conditions upon rotation of said central shaft and said opposite side portions of said body relative to said housing so as to allow limited rotations of said opposite end portions of said communication element relative to one another before reversing rotation direction becomes necessary.

19. The device of claim 18 wherein:

said inner and outer portions of said opposite end walls of said housing are substantially flat and circular in shape; and said continuous sidewall of said housing is substantially cylindrical in shape.

20. The device of claim 18 further comprising:

a pair of opposite shaft collars mounted to said opposite ends of said central shaft adjacent to and outside of said opposite end walls of said housing, said opposite shaft collars for rotatably retaining said central shaft through said central holes of said inner and outer portions of said opposite end walls of said housing.

* * * * *